Fig. I

United States Patent Office 2,802,161
Patented Aug. 6, 1957

2,802,161

MOTOR CONTROL APPARATUS

Maurice E. Reagan and Sheldon D. Silliman, Pittsburgh, Pa., assignors to Westinghouse Electric Corporation, East Pittsburgh, Pa., a corporation of Pennsylvania Application April 26, 1956, Serial No. 580,808

5 Claims. (Cl. 318—170)

This invention relates to motor control apparatus and has particular relation to motor control apparatus which includes facilities for disconnecting the motor from the supply on the occurrence of a locked rotor condition.

A motor control system including means for protecting against locked rotor is disclosed in Reagan Patent 2,262,652, dated November 11, 1941. This patent discloses a protective circuit including a sequencing unit having a number of electromagnetic relays which are operated in a predetermined sequence during the starting of the motor and actuate a latch to disconnect the motor if a locked rotor condition occurs. This apparatus is, on the whole, highly satisfactory, but because the apparatus protected has a high cost, the interest in reliability and permanency is essential in the protective system, and it is an object of this invention to provide locked rotor protective means for motor control apparatus which shall have such reliability and permanency as to assure the motor of protection over long time intervals.

An additional feature of the Reagan apparatus which is sometimes objectionable is the complexity of its operation. The operation of Reagan's sequencing unit is started by a relay which has a pair of exciting windings, the current through which may be balanced. The sequencing operation which depends on the actuation of the relay is of a complex character, and it is a further object of this invention to provide locked rotor protective means which shall be relatively simple in its operation for motor control apparatus.

An incidental object of this invention is to provide a novel pulse counting circuit.

This invention arises from the realization that it is the presence of the relays in the sequence unit which militates against the reliability and permanency of the protective means. The relays have a number of contacts which are opened and reclosed during each starting operation of the motor, and the reliability and permanency of the system is limited by the useful life of the contacts, which may be short. In accordance with this invention, a motor control apparatus is provided having a locked rotor protective system including magnetic Logic elements. Such elements do not have movable contacts, and the life and reliability of the system is thus substantially unlimited. In addition, the operation of the novel protective system is relatively simple.

The Logic elements included in a protective system in the preferred practice of this invention are a DELAY network, a NOT network, a plurality of AND networks and a plurality of FLIP-FLOP networks. In the following discussion and in the claims, the different Logic elements will be written in capital letters as above, and will be referred to simply as DELAY, NOT, AND and FLIP-FLOP without the word network.

The operation of the locked rotor protective system, according to this invention, depends on the presence of a slip potential in the field circuit of the motor when the rotor is rotating. The slip potential during starting is of a different frequency than the source potential, and in the practice of the invention, the slip potential and the source potential are combined to produce a composite fluctuating potential which may be converted into a pulsating potential. This pulsating potential, if present, and the source potential are impressed as signals on the Logic element circuit to prevent actuation of the release latch which controls the motor contactors. If the rotor fails to rotate, the pulsating potential is not produced and the latch is actuated.

The actuation of the release latch is controlled by the cooperation of a DELAY and a FLIP-FLOP. The DELAY is connected to the source potential signal supply in such manner that its timing out is started on the appearance of the source potential signal. The FLIP-FLOP is connected to the DELAY in such manner that it is actuated by the DELAY when the latter times out. The FLIP-FLOP is so connected to the pulsating potential signal supply that on the occurrence of at least two pulses, the FLIP-FLOP is set so that it is prevented from actuating the latch on the timing out of the DELAY.

The novel features considered characteristic of this invention are described generally above. The invention itself both as to its organization and as to its method of operation, together with additional objects and advantages thereof, will be understood from the following description of specific embodiments taken in conjunction with the accompanying drawings, in which:

Fig. 4 showing the manner in which the slip potential is applied in effecting the control involved in the invention.

Figure 1:
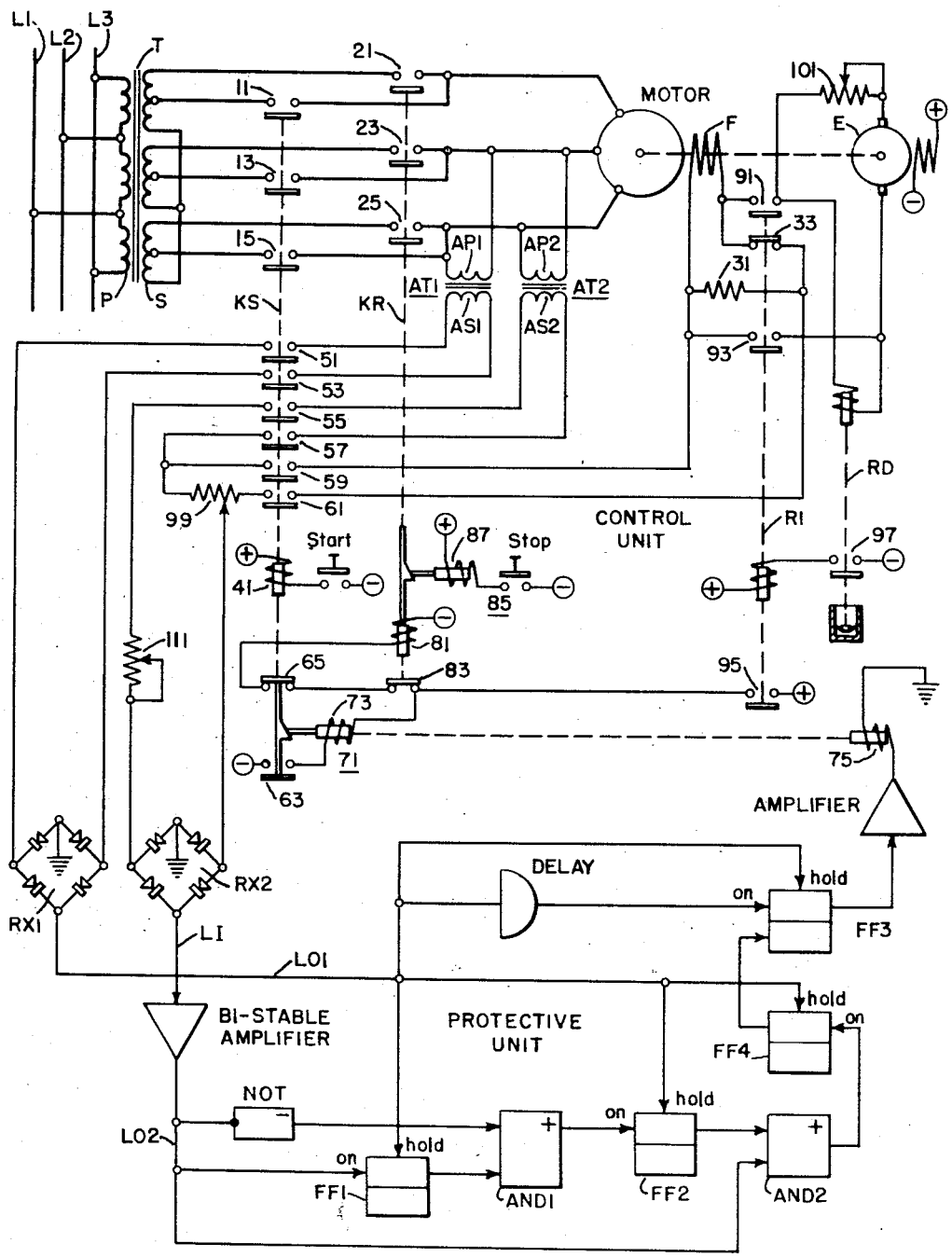
Figure 1 is a circuit diagram of an embodiment of this invention.

Figure 1.—Description

The apparatus shown in Fig. 1 includes a Motor, a Control Unit for the Motor and a Protective Unit for preventing damage to the Motor under locked rotor conditions. This apparatus is supplied through a supply transformer T having primary P and secondary S from conductors L1, L2, L3, energized from a commercial polyphase source. The windings of the secondary S have intermediate taps which make feasible the supply of a lower potential during starting than during running.

The Motor includes an armature A and a shunt field winding F. The armature A of the Motor is adapted to be supplied from the secondary S at a reduced voltage through the contacts 11, 13, 15 of a starting contactor KS and at a higher voltage through the contacts 21, 23, 25 of a running contactor KR, both of which are controlled from the Control Unit. The winding F is, when the Motor is deenergized, connected across a discharge resistor 31 through the normally closed contact 33 of a relay R1 in the Control Unit.

The Control Unit includes in addition to the contactors KS and KR and the relay R1 a time delay relay RD, an exciter E, and auxiliary transformers AT1 and AT2. The contactor KS includes an exciting coil 41 which is adapted to be connected to a power supply through a start push button. The contactor KS also includes in addition to the contacts 11, 13, 15, a plurality of auxiliary normally open contacts 51, 53, 55, 57, 59, 61, 63 and a normally closed contact 65. The contactor KS has an electromagnetically operable latch 71 which may maintain the contactor in the closed position independently of the supply of current through its coil 41. This latch is releasable by energization of a solenoid 73. The release latch 71 may also be actuated by another solenoid 75 in the Protective Unit.

The contactor KR includes a coil 81 and a normally closed contact 83, in addition to the contacts 21, 23, 25. The contactor KR includes a latch 85 for holding it in the closed position; the latch 85 is releasable by actuation of a solenoid 87. The solenoid 87 may be energized by closing a stop push button.

The relay R1 includes in addition to its closed contact 33 a plurality of normally open contacts 91, 93, 95. The time-delay relay RD has a normally open contact 97 and is of the type which when once energized requires a predetermined time to close this contact.

The discharge resistor 31 is adapted to be connected across a variable resistor 99 through the normally open contacts 59 and 61 of the contactor KS.

The exciter E is adapted to be connected across the winding F through normally open contacts 91 and 93 of the relay R1 and a variable resistor 101. The exciter is connected to be rotated from armature A. The coil of relay RD is connected across exciter E and is also adapted to be connected across the winding F through the contacts 91 and 93. The coil of the relay R1 is adapted to be connected to an energizing supply through the normally open contact 97 of the relay RD.

The release solenoid 73 is adapted to be connected to an energizing supply through the normally open contact 95 of the relay R1 and a normally open contact 63 of the contactor KS. The coil 81 of the contactor KR is adapted to be connected to a supply through the normally open contact 91 of the relay R1, its normally closed contact 83 and the normally closed contact 65 of the contactor KS.

Each transformer AT1 and AT2 has a primary AP1 and AP2 connected to be energized from one phase of the potential across the armature A when the armature is energized and a secondary AS1 and AS2, respectively. The secondary AS1 is adapted to be connected through a pair of the normally open contacts 51 and 53 of contactor KS to the alternating terminals of a rectifier RX1 in the Protective Unit. The direct-current output of the rectifier is impressed between a conductor LO1 and ground. The secondary AS2 is adapted to be connected through a pair of normally open contacts 55 and 57 of the starting contactor KS, a variable resistor 111 and a portion of the variable resistor 99 to the alternating terminals of another rectifier RX2 in the Protective Unit. The direct-current potential of this rectifier is impressed between conductor LI and ground.

The potential impressed on the alternating terminals of the rectifier RX2 is the resultant of the potentials from the winding F and from the secondary AS2, the latter being the potential of one phase of the supply. It is desirable that the variable resistors 99 and 111 in circuit with the alternating-current terminals of the rectifier RX2 be so set that the amplitude of the component potentials are equal. Under such circumstances, the resultant potential is made up of a component having a frequency equal to half the difference between frequency of the supply and the frequency included in the field winding F modulated by a potential having a frequency equal to half the sum of the supply frequency and the frequency induced in the field winding F. If the rotor A rotates, the resultant is thus a potential of a frequency of the order of 60 cycles per second, the amplitude of which is varied at a rate dependent on the difference between the supply frequency and the slip frequency.

Figure 4:
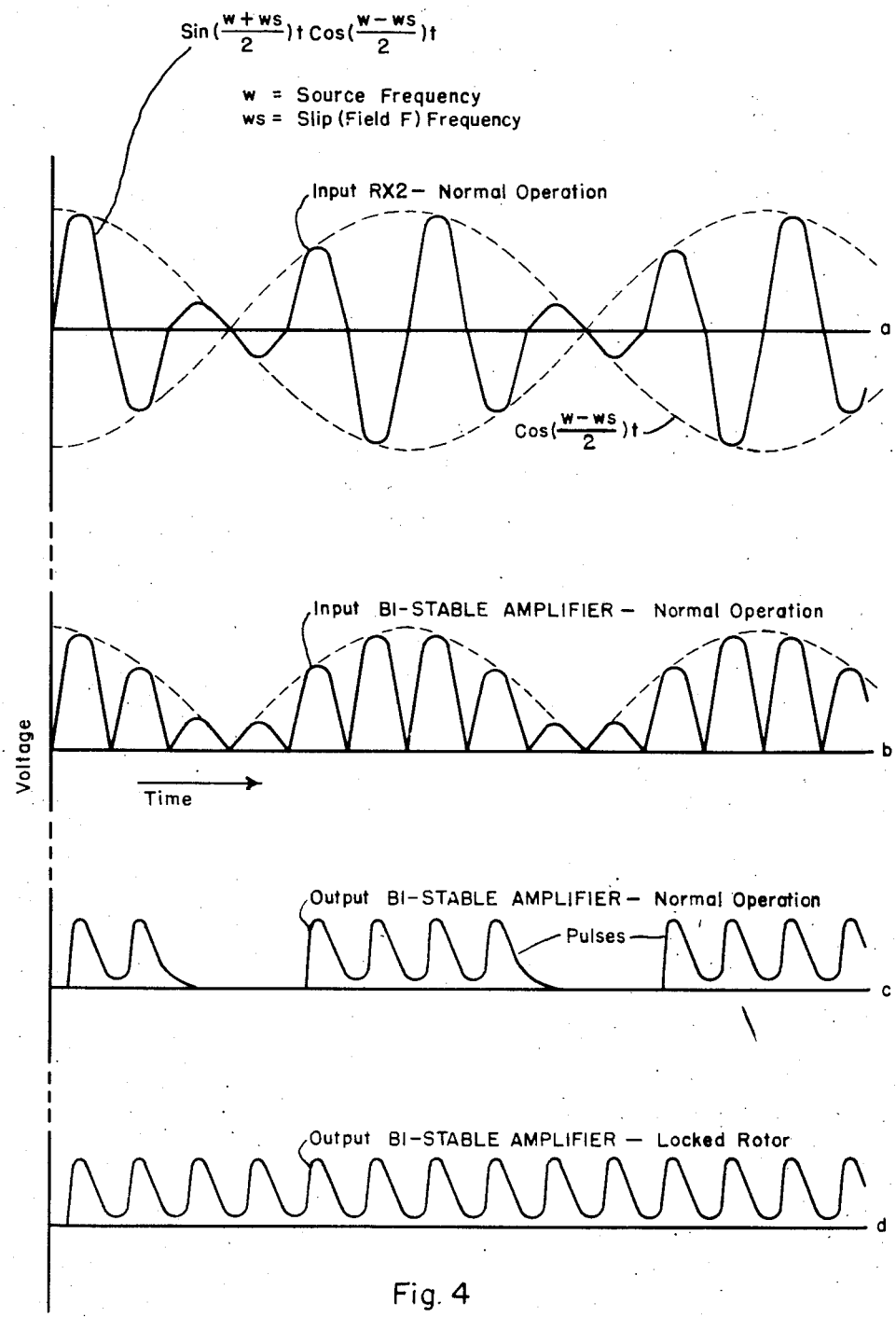
Figs. 4 and 5 are graphs illustrating the operation of this invention.

Graph $a$ of Fig. 4 shows such a composite potential as a function of time. In this graph, voltage is plotted vertically and time horizontally. The rectifier output of rectifier RX2 is shown graphically in Fig. 4b, where again voltage is plotted vertically and time horizontally. It is seen that the resultant potential is of the fluctuating or beat type.

The Protective Unit includes, in addition to the rectifiers RX1 and RX2 and the variable resistor 111, a Bi-Stable Amplifier, a DELAY, a NOT, a first FLIP-FLOP, FF1, a second FLIP-FLOP, FF2, a third FLIP-FLOP, FF3, a fourth FLIP-FLOP, FF4, a first AND, AND1 and a second AND, AND2. In addition, the Protective Unit includes an Amplifier and the solenoid 75. The NOT and ANDS, AND1 and AND2, are similar to those disclosed in an application, Serial No. 554,828, filed December 22, 1955 to Richard O. Decker et al., and assigned to Westinghouse Electric Corporation. The DELAY is of the type which is caused to time out when a signal is impressed on it and when it times out supplies an output signal of the full-wave or half-wave type.

Figure 3:
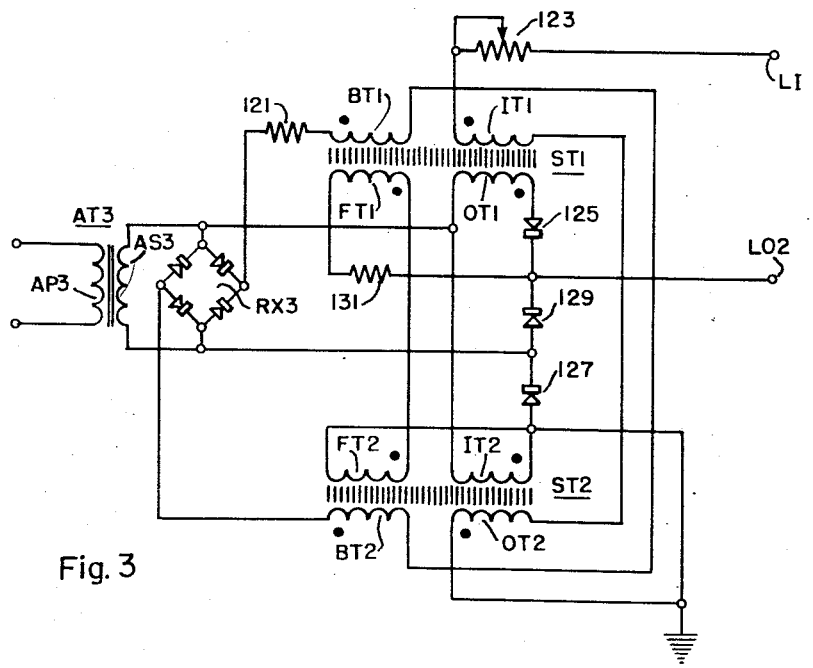
Fig. 3 is a circuit diagram showing a bi-stable amplifier used in the practice of this invention.

A typical By-Stable Amplifier is shown in Fig. 3. This amplifier includes a pair of saturable transformers ST1 and ST2, each having an input winding IT1 and IT2, an output winding OT1 and OT2, and bias windings BT1 and BT2 and feedback windings FT1 and FT2. Potential is supplied to this amplifier from a transformer AT3 having a primary AP3 which may be energized from a phase of the supply L1, L2, L3 through a suitable transformer (not shown). The secondary AS3 supplies a rectifier RX3 across the direct-current terminals of which the biasing windings BT1 and BT2 are connected in series through a biasing resistor 121. The input windings IT1 and IT2 are connected in series between the input conductor LI and ground through a variable resistor 123. The output windings OT1 and OT2 have a common junction at one terminal of each which is connected to one terminal of the secondary AS3. The other terminal of one of the output windings OT1 is connected through a rectifier 125 to the output conductor LO2; the other terminal of the other output winding is connected directly to ground. Between the conductor LO2 and ground a pair of rectifiers 127 and 129 are connected in series in such a sense as to conduct positive current from ground to the conductor. By positive current the flow of ions or holes as distinct from electrons is meant. The junction J1 of these rectifiers 127 and 129 is connected to a terminal of secondary AS3. The feedback windings FT1 and FT2 are connected in series with the output conductor LO2 and ground through a resistor 131.

In the use of the amplifier, the bias resistance 121 is set so that for signals less than a predetermined magnitude, the cores of the transformers ST1 and ST2 are unsaturated and the output windings OT1 and OT2 have a high impedance so that the output potential (LO2 to ground) is substantially zero. A signal impressed on the input conductor LI which counteracts the biasing potential only to a small extent tends to increase the saturation of the transformers. This increase in saturation is accentuated by the flow of direct current through each of the output windings OT1 and OT2 and through an associated one of the rectifiers 127 or 129. Thus, when the upper terminal of secondary AS3 is positive relative to the lower terminal, current flows from the upper terminal through the upper output windings OT1, the load (LO2 to ground), the lower of the two series connected rectifiers 127 to the lower terminal of AS3; when the potential of AS3 reverses, current flows from the lower terminal through the upper of the series rectifiers 129, the load, the lower output winding OT2 to the upper terminal of AS3. The increased direct current thus carried by the output windings OT1 and OT2 tends to increase further the saturation of the cores. An additional increase in the saturation of the cores is also effected by the flow of feedback current through the feedback windings FT1 and FT2. For a small signal, the cores are thus abruptly saturated and the output signal rises abruptly to the maximum magnitude.

A suitable DELAY is disclosed in application, Serial No. 580,579, filed April 25, 1956, to Richard L. Bright, and assigned to Westinghouse Electric Corporation, and an application Serial No. 580,615, filed April 25, 1956 to Sheldon D. Silliman et al. and assigned to Westinghouse Electric Corporation.

Figure 2:
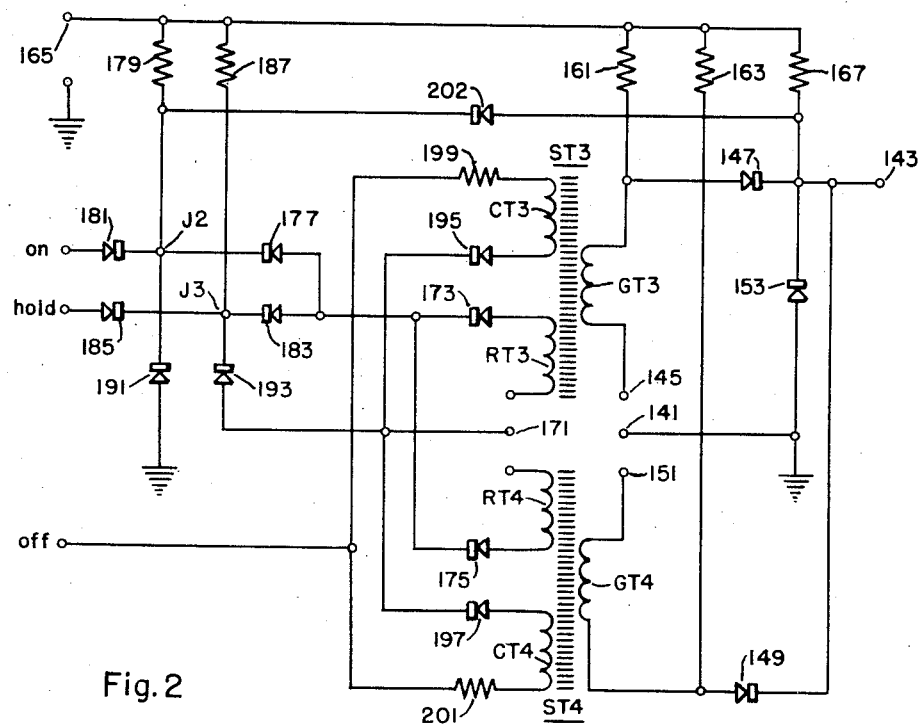
Fig. 2 is a circuit diagram showing a FLIP-FLOP with a hold terminal used in the practice of this invention.

A FLIP-FLOP having a hold terminal is shown in application Serial No. 517,790, filed June 24, 1955, now Patent No. 2,760,085, to Robert I. Van Nice and assigned to Westinghouse Electric Corporation. A FLIP-FLOP of the same general type is shown in Fig. 2.

This FLIP-FLOP includes a pair of saturable transformers ST3 and ST4 each having gating windings GT3 and GT4, resetting windings RT3 and RT4 and resetting counteracting winding CT3 and CT4. The gating windings GT3 and GT4 are supplied in opposite phase from an alternating potential supply, not shown, having a grounded center tap 141. The output of the FLIP-FLOP is connected between ground and a hot output terminal 143. The gating winding GT3 of one transformer is connected between one end terminal 145 of the alternating current and the hot terminal 143 through a rectifier 147 and the other gating winding GT4 is similarly connected through a rectifier 149 between the other alternating terminal 151 and the hot terminal 143. A rectifier 153 is connected between ground and terminal 143 in a sense to conduct oppositely to rectifiers 147 and 149.

The junctions of each of the rectifiers 147 and 149 and the associated gating winding GT3, GT4 are connected each through resistors 161 and 163 to the hot terminal 165 of a direct-current biasing supply (not shown) and through it to ground. The output terminal 143 is also connected through a resistor 167 to the hot terminal 165 of the biasing supply.

Resetting windings RT3 and RT4 of each transformer is adapted to be supplied with a resetting signal from a supply (not shown) having a grounded center tap 171. Each of these resetting windings RT3 and RT4 is connected to a junction J2 on which the On signal is impressed through rectifiers 173 and 175 associated with each winding and through a common rectifier 177. The junction J2 is connected to the hot terminal 165 of the biasing supply through a resistor 179 and to the on terminal of the FLIP-FLOP through a rectifier 181. Each of the resetting windings RT3 and RT4 is also similarly connected through rectifiers 173, 175 and 183 to a junction J3 on which a hold signal is impressed through a rectifier 185. The junction J3 is connected to the hot terminal 165 through a resistor 187. The junctions J2 and J3 are connected to ground through rectifiers 191 and 193, respectively, each poled to conduct oppositely to the rectifiers 181 and 185 on which the on and hold signals are impressed.

The other windings CT3 and CT4 of the saturable transformers are connected at one of their terminals, each through rectifiers 195 and 197 to ground and at the other terminal each through resistors 199 and 201 to the off terminal of the FLIP-FLOP. The hot output terminal 143 is connected through a rectifier 202 to J2 (but not to J3).

When the FLIP-FLOP is in stand-by, gating potentials are supplied during alternate half periods to the gating windings GT3 and GT4. The bias 165 prevents resetting potential from being supplied through the resetting windings during the succeeding half periods in each case. There is then substantially no potential between the output terminals of the FLIP-FLOP.

When a Hold signal is impressed on junction J3, the resetting windings RT3 and RT4 are conditioned to conduct resetting current during the appropriate half periods, but these windings do not conduct because they are still biased through junction J2. When an on signal is impressed on junction J2, this bias is counteracted and the resetting windings RT3 and RT4 are reset so that an output potential appears between the output terminals 143 and ground of the FLIP-FLOP. This output potential is of the full-wave type.

When an output signal appears between the output terminals (143 and ground) of the FLIP-FLOP for the first time, this signal is impressed on J2, permitting resetting of the resetting windings RT3 and RT4 independently of any on signal. But this output signal is not impressed on junction J3 so that the FLIP-FLOP continues to produce an output only so long as there is adequate potential on the hold terminal. Once this potential is removed, the output potential disappears from the FLIP-FLOP.

If subsequently an Off signal is impressed on the Off terminal, this signal is impressed on both of the windings CT3 and CT4 and prevents the signal on the on terminal from resetting the FLIP-FLOP in spite of the presence of a signal on the hold terminal. FLIP-FLOP is thus reverted to the off condition.

The hot output terminal of the rectifier RX2 is impressed between the input terminals LI and ground of the Bi-Stable Amplifier. The bias on the amplifier is so set that to produce an output the input to the Amplifier must be equal to a magnitude somewhat smaller than the amplitude of, say, the second wave of the output of RX2 (see graph b, Fig. 4). Under the circumstances, the output of the Bi-Stable Amplifier is made up of a series of trains of half waves or pulses which exist at predetermined intervals. This potential is shown as a function of time in graph c of Fig. 4. It is seen that for normal operation the half wave pulses are separated by appreciable time intervals of the order of several periods of the supply.

In the event that the motor A fails to rotate, alternating potential of supply frequency induced in the field F is added to the alternating potential supplied by the secondary AS2. The resultant is a potential of the frequency of the supply depending in amplitude on the phase relationship of the potential of the field winding F and the potential of the secondary AS2. If this amplitude exceeds the bias impressed on the Bi-Stable Amplifier sufficiently to actuate the Amplifier, a signal is produced in the output of the Amplifier which consists of a continuous series of half waves as shown in graph d of Fig. 4. If the resultant potential does not have sufficient amplitude to overcome the bias, the potential at the output of the Bi-Sable Amplifier is zero.

The Amplifier may be of the type disclosed in the above-described Decker application, but preferably should be of the full-wave type. A typical amplifier of this type is disclosed in Patent 2,719,260, dated September 17, 1955, to D. G. Scorgi.

Now returning to Fig. 1, the DELAY and the hold terminals of FLIP-FLOPS FF1, FF2, FF3 and FF4 are connected to be supplied with potential from the rectifiers RX1, and when the contactor KS is actuated, full-wave potential is supplied. The NOT, the on terminal of FF1, and one of the terminals of AND2 are supplied from the Bi-Stable Amplifier. If the motor is rotating, this potential is of the pulse type represented in graph c of Fig. 4; if the rotor is locked, this potential is zero or a continuous full wave is represented in graph d of Fig. 4.

The output of DELAY is connected to the on terminal of FF3, so that after DELAY times out, an on signal is impressed on FF3. The output of the NOT is impressed as one input on AND1. The other input on AND1 is the output of FF1. Thus, when FF1 is in the on condition and NOT is in the unactuated condition, AND1 is actuated. The output of AND1 is impressed on the on terminal of FF2; the output of FF2 is impressed as the other input of AND2, and when FF2 is actuated and there is a signal on LO2, AND2 is actuated. The output of AND2 is impressed on the on terminal of FF4, and the output of FF4 is impressed on the off terminal of FF3, so that when there is a signal at the output of FF4, FF3 is reverted to the Off condition. The operation of FF3 is such that when signals are impressed on the on terminal and the off terminal simultaneously, the off signal predominates and FF3 is in the off condition. Since the output of FF4 is of the full-wave type, FF4 predominates over DELAY regardless of whether the latter is of the half-wave or full-wave output. The output of FF3 is connected to the Amplifier, the output of which supplies the solenoid 75.

The ANDS and NOT are of the type producing a half-wave output. The outputs of ANDS and NOT may then occur during the same half period or during alternate half periods, and it is important that the operation of these components be set so that the outputs occur properly. The proper setting is indicated in Fig. 1 by plus and minus signs in the upper right-hand corners of the components. Where components are labeled with the same signs, their outputs occur during the half periods of the same polarity. Of two components labeled with a plus sign and a minus sign, respectively, one produces an output during one half period and the other during the succeeding half period. To help in the understanding of the operation of the apparatus, FLIP-FLOPS FF1 and FF2 are also labeled. These labels indicate the output which is effective in actuating the components to which these FLIP-FLOPS are connected. Thus, FF1 is effective during ah alf period which occurs before the half period during which AND1 may have an output.

Stand-by.—Figure 1

During stand-by, power is supplied to the conductors L1, L2, L3 by closing of the usual disconnects or circuit breakers (not shown). The exciter E is at this time deenergized because the Motor is not rotating. Since there is no potential across F, relay RD is deenergized and relay R1 is also deenergized. The contactors KS and KR are open, and the armature A and field F are deenergized. There is then no potential at rectifiers RX1 and RX2, and there is no potential at the output conductors LO1 and LO2. DELAY is then unactuated and is not timing. There is no signal on the hold of FF1, FF2, FF3 and FF4 so that FF1, FF2, FF3 and FF4 are not producing an output signal. NOT has an output signal. Since there is no output signal on FF3, the Amplifier is deenergized as is also the associated solenoid 75. Since there is no signal in the output of FF1, AND1 is not actuated and there is no on signal at FF2. Since there is no on signal at FF2 and no signal at LO2, AND2 is unactuated and there is no Off signal on FF3.

Operation.—Figure 1

The operation of the Fig. 1 apparatus will be explained with the aid of Fig. 5. This figure presents a number of graphs, *a* through *j*, in each of which potential is plotted vertically as a function of time. Graph *a* shows the potential between LO1 and ground, graph *b*, the potential between LO2 and ground when the Motor is rotating. (This is graph *c* of Fig. 3, but the pulses are shown each consisting of two half waves instead of four.) Graphs *c* through *j* prevent the potentials at the outputs of FF1, NOT, AND1, FF2, AND2, FF4, FF3 and DELAY, respectively for the condition when the Motor rotates. In the case of components which have a half wave output (*d, e, g*) the half waves which actually occur during operation are shown in full lines and those which do not occur in light broken lines.

To start the Motor, the start button is closed actuating contactor KS. The armature A is then connected to the secondary S through contacts of contactor KS and is energized. Transformers AT1 and AT2 are also energized so that there is potential across the secondaries AS1 and AS2. The potential across AS1 is impressed through the contacts 51, 53 on conductor LO1 and appears as a full-wave potential, as shown in graph *a*. The hold signal is then impressed on FF1, FF2, FF3 and FF4. FF1, FF2, FF3 and FF4 are then conditioned to be actuated. In addition, the timing out of DELAY is started.

If the Motor starts to rotate, the pulse signal appears on LO2 and through it on NOT, FF1 and AND2. The first pulse actuates NOT and FF1. AND1 receives a signal from FF1 but not from NOT and is not actuated.

Now as the armature A starts to rotate, the exciter E is energized and its output increases as the speed of armature A increases. Eventually, RD is energized and the timing out of RD starts.

Figure 5:
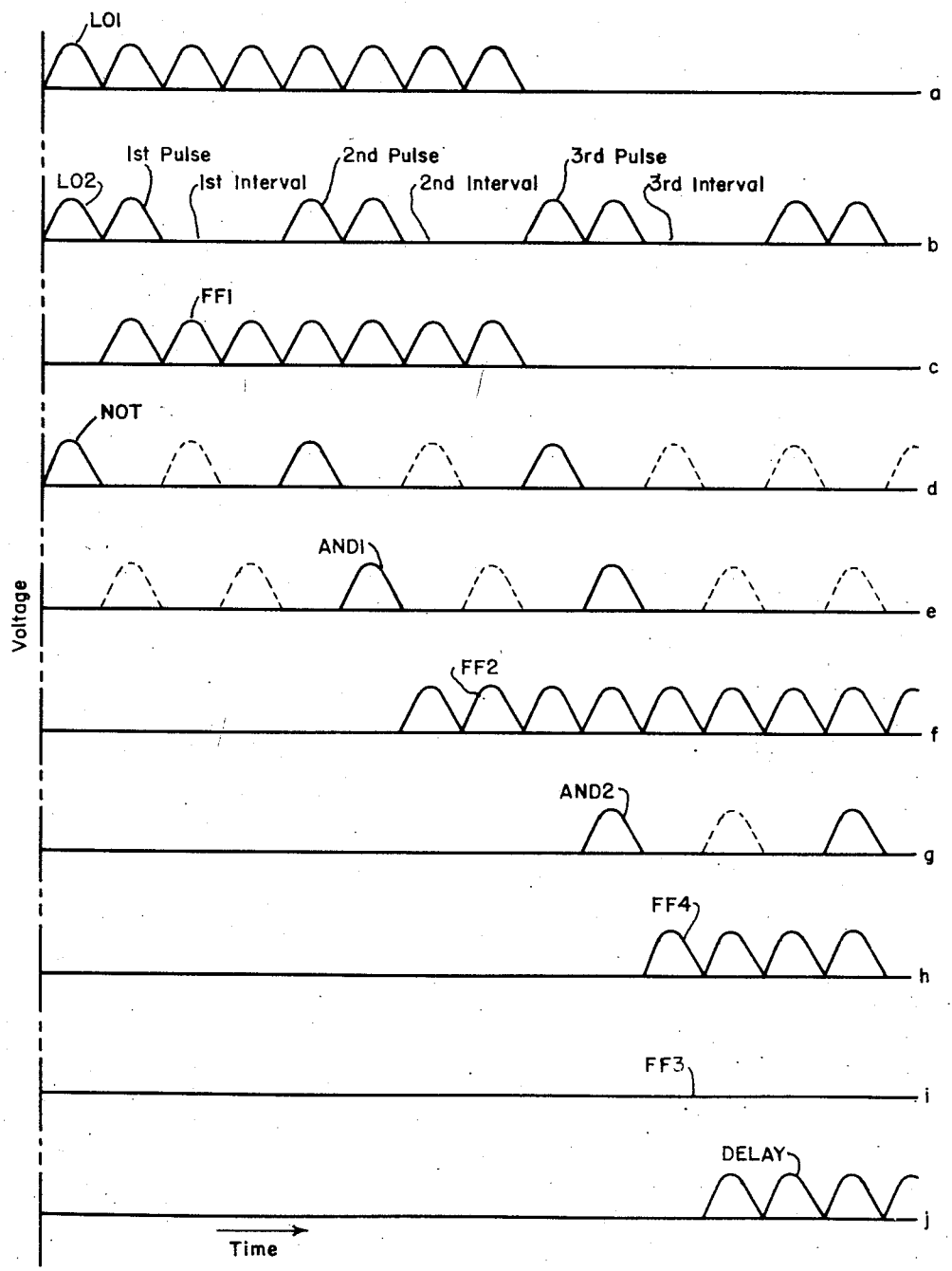

While RD is timing out, the interval between the first and second pulses from LO2 occurs (see graph *b*, Fig. 5). NOT is then unactuated and produces a signal (the second loop of graph *d*, Fig. 5). AND1 is then actuated (graph *e*, Fig. 5) actuating FF2 (graph *f*, Fig. 5). There is now a signal on one input terminal of AND2. When the third pulse on LO2 occurs (graph *b*, Fig. 5), AND2 is actuated (graph *g*, Fig. 5) actuating FF4 (graph *h*, Fig. 5), and an off signal is supplied to FF3. FF3 is thus maintained in the off condition (graph *i*, Fig. 5), and the energization of the Amplifier is prevented so that the actuation of the releasing latch 71 for the contactor KS is prevented. Subsequently, the third interval occurs between the pulses transmitted by LO2 (graph *b*, Fig. 5), and AND2 is unactuated (graph *g*, Fig. 5) but this has no effect on FF4.

DELAY may now time out (graph *j*, Fig. 5), but the timing out of DELAY has no effect since its output signal appears during the same half periods on the on terminal of FF3 as the output signal from AND2 appears on the off terminal, and the off signal predominates.

Now the timing out of the relay RD continues and eventually it is actuated, energizing relay R1. At the now closed contacts 91, 93 of the relay R1, the coil of relay RD is connected directly across the field F and is maintained closed so long as there is adequate potential across the field F. Through now closed contacts 95 of relays R1 and 63 of contactor KS, a circuit is closed through the latching solenoid 73 of the contactor KS actuating this solenoid and permitting the contactor KS to drop out. A circuit is now closed through the normally open contact 95 of relay R1 and the normally closed contacts 83 and 65 of contactors KR and KS to energize contactor KR. The armature is now connected through the contacts 21, 23, 25 of KR so that it is supplied with the full voltage.

The actuation of relay R1 also opens the contact 33 across the discharge resistor 31 and the field F is disconnected from the terminal LO2. By the opening of the contacts 51, 53, 55, 57, 59 and 61 of contactor KS, the supply of potential to conductor LO1 is also interrupted and the supply of signal to the Protective Unit through this conductor is interrupted. The DELAY is then reset, and because the hold signal disappears, FF1, FF2 and FF4 are reverted to their off condition.

The Protective Unit is thus completely reset and the Motor may continue to operate so long as the contactor KR remains actuated. To stop the operation of the Motor, the stop button is closed energizing the latching solenoid 87 for contactor KR and permitting this contactor to drop out.

Assume now that instead of rotating the rotor A is locked. The potential on LO2 is then either zero or a continuous half wave as shown in graph *d*, Fig. 4. In the former event, AND1 is not actuated because FF1 is not actuated and there is no signal at its output. In the latter event, AND1 is not actuated because NOT is actuated and there is no signal at its output. In either event, the actuation of FF4 is prevented, and DELAY times out and eventually FF3 is actuated to release the latch 71 on the starting contactor KS.

While a preferred embodiment of this invention has been disclosed herein, many modifications hereof are feasible. The invention, therefore, is not to be restricted except insofar as is necessitated by the spirit of the prior art.

We claim as our invention:

1. Apparatus for controlling the supply of power to a motor from an alternating-current source, said motor being adapted to be supplied through contactor means connected to said motor when actuated connecting said motor to said source, said motor being of the type which during starting produces an alternating-current slip potential of a different frequency than that of said source, the said apparatus comprising in combination, means responsive to actuation of said contactor means for deriving a potential signal from said source, means responsive to actuation of said contactor means for deriving a slip-potential signal from said motor, a FLIP-FLOP having a first condition and a second condition, means connected to said FLIP-FLOP and to said contactor means for interrupting the actuation of said contactor means when said FLIP-FLOP is in said first condition, a DELAY capable of timing out in a predetermined interval, means connected to said source potential deriving means and to said DELAY for starting the timing out of said DELAY when a source potential is present, means connected to said DELAY and to said FLIP-FLOP and responsive to said DELAY for setting said FLIP-FLOP in said first condition on the timing out of said DELAY, and means connected to said slip-potential deriving means and to said FLIP-FLOP and responsive to said slip potential for setting said FLIP-FLOP in said second condition within a time interval appreciably shorter than said predetermined time interval on the occurrence of a slip-potential and thereafter maintaining said FLIP-FLOP in said second condition.

2. In combination, a motor having a field winding, power supply conductors, contactor means connected to said motor and conductors having unactuated and actuated conditions and when in actuated condition connecting said conductors in energy supply relationship with said motor, means connected to said contactor means and conductors for deriving a supply-potential signal from said conductors when said contactor means is in said actuated condition, means connected to said field winding and said contactor means for deriving a signal dependent on the potential of said field winding when said contactor means is actuated, said signal being a pulse potential if said motor starts to rotate and a zero amplitude or a continuous full-wave signal if said motor fails to rotate, a DELAY when actuated timing out in a predetermined time interval, a NOT, a first AND, a second AND, a first FLIP-FLOP, a second FLIP-FLOP, a third FLIP-FLOP, a fourth FLIP-FLOP, each of said FLIP-FLOPS requiring a hold signal permitting operation thereof and each also having a first condition and a second condition, release means connected to said contactor means when actuated reverting said contactor means from actuated to unactuated condition, means connected to said first, second, third and fourth FLIP-FLOPS, respectively, and to said supply potential signal deriving means for impressing hold signals on said FLIP-FLOPS when a supply-potential signal is delivered, means connected to said supply potential deriving means for actuating said DELAY to start a timing operation when a supply-potential signal is delivered, means connecting said DELAY to said third FLIP-FLOP for setting said third FLIP-FLOP in said first condition on the timing out of said DELAY, means connected to said third FLIP-FLOP and to said release means for actuating said release means on the setting of said third FLIP-FLOP in said first condition, means connecting said dependent signal deriving means to said NOT for impressing a potential to actuate said NOT when a signal is delivered by said dependent signal deriving means, means connecting said dependent signal deriving means to said first FLIP-FLOP to set said first FLIP-FLOP in its first condition on the delivery of a signal by said dependent signal deriving means, means connecting said first NOT and said first FLIP-FLOP to said first AND to actuate said first AND when said first NOT is unactuated and said first FLIP-FLOP is in said first condition, means connecting said first AND to said second FLIP-FLOP to set said second FLIP-FLOP in its first condition on actuation of said first AND, means connecting said second FLIP-FLOP and said dependent signal deriving means to said second AND to actuate said second AND when said second FLIP-FLOP is in said first condition and a signal is delivered by said dependent signal deriving means, means connecting said second AND to said fourth FLIP-FLOP to set said fourth FLIP-FLOP to said first condition, on actuation of said second AND, means connecting said fourth FLIP-FLOP to said third FLIP-FLOP to set said third FLIP-FLOP in its second condition on the actuation of said fourth FLIP-FLOP.

3. A pulse counter for counting pulses delivered by pulse potential supply means, said means including signalling means for producing a potential signal during the supply of said pulses, the said counter comprising in combination a NOT, a first FLIP-FLOP, a second FLIP-FLOP, a first AND, a second AND, each said FLIP-FLOP having an actuated condition and an unactuated condition and being capable of passing from one of said conditions to the other on the impressing of an on signal thereon only while a hold signal is impressed thereon, means connected to said FLIP-FLOPS respectively and to said producing means for impressing said potential signal as a hold signal on said FLIP-FLOPS, means connected to said supply means and said NOT for actuating said NOT on the existence of a pulse potential, means connecting said supply means to said first FLIP-FLOP for setting said first FLIP-FLOP in actuated condition on the existence of a pulse potential, means connecting said NOT and said first FLIP-FLOP to said first AND for actuating said first AND when said NOT is unactuated and said first FLIP-FLOP is in actuated condition, means connecting said first AND to said second FLIP-FLOP for setting said second FLIP-FLOP in its actuated condition on the actuation of said first AND, and means connecting said second FLIP-FLOP and said supply means to said second AND to actuate said second AND when said second FLIP-FLOP is in actuated condition and a pulse potential exists.

4. Apparatus for controlling the supply of power to a motor from an alternating current source, said motor being adapted to be supplied through contactor means connected to said motor when actuated connecting said motor to said source, said motor being of the type which during starting produces an alternating-current slip potential of frequency different than that of said source, the said apparatus comprising in combination, means responsive to actuation of said contactor means for deriving a potential signal from said source, means responsive to actuation of said contactor means for deriving a slip-potential signal from said motor, a FLIP-FLOP having a first condition and a second condition, means connected to said FLIP-FLOP and to said contactor means for interrupting the actuation of said contactor means when said FLIP-FLOP is in said first condition, a DELAY capable of timing out in a predetermined interval, means connected to said source potential deriving means and to said DELAY for starting the timing out of said DELAY when a source potential is present, means connected to said DELAY and to said FLIP-FLOP and responsive to said DELAY for setting said FLIP-FLOP in said first condition on the timing out of said DELAY, means connected to said slip-potential deriving means and to said FLIP-FLOP and responsive to said slip potential for setting said FLIP-FLOP in said second condition on the occurrence of a slip-potential within a time interval appreciably shorter than said predetermined time interval and for thereafter maintaining said FLIP-FLOP in said second condition, and means connected to said FLIP-FLOP and said slip-potential responsive means, for preventing said slip-potential responsive means from reverting said FLIP-FLOP to said second condition once it is set in its first condition.

5. Apparatus for controlling the supply of power to a motor from an alternating-current source, said motor being adapted to be supplied through contactor means connected to said motor when actuated connecting said motor to said source, said motor being of the type which during starting produces an alternating-current slip potential of a different frequency than that of said source, the said apparatus comprising in combination, means responsive to actuation of said contactor means for deriving a potential signal from said source, means responsive to actuation of said contact means for deriving a slip-potential signal from said motor, means connected to said source potential deriving means and to said slip-potential deriving means for deriving a pulse signal dependent on the relationship between said source potential and slip potential signals, a FLIP-FLOP having a first condition and a second condition, means connected to said FLIP-FLOP and to said contactor means for interrupting the actuation of said contactor means when said FLIP-FLOP is in said first condition, a DELAY capable of timing out in a predetermined interval, means connected to said source potential deriving means and to said DELAY for starting the timing out of said DELAY when a source potential is present, means connected to said DELAY and to said FLIP-FLOP and responsive to said DELAY for setting said FLIP-FLOP in said first condition on the timing out of said DELAY, and means connected to said pulse potential deriving means and to said FLIP-FLOP and responsive to the occurrence of at least two pulses at said pulse potential deriving means within a time interval appreciably shorter than said predetermined interval for setting and maintaining said FLIP-FLOP in said second condition.

No references cited.